United States Patent [19]
Rasmussen

[11] Patent Number: 5,553,825
[45] Date of Patent: Sep. 10, 1996

[54] MECHANICAL CAMPER JACK

[76] Inventor: C. Martin Rasmussen, 374 S. Stirling Dr., Fruit Heights, Utah 84037

[21] Appl. No.: 275,597

[22] Filed: Jul. 15, 1994

Related U.S. Application Data

[63] Continuation-in-part of Ser. No. 983,073, Nov. 30, 1992, Pat. No. 5,348,258.

[51] Int. Cl.$^6$ .................................................. B66F 7/00
[52] U.S. Cl. ...................... 248/354.3; 248/548; 248/650; 411/432
[58] Field of Search .............................. 248/354.1, 354.3, 248/548, 351, 354.4, 650, 188.4; 74/89.15; 254/103, 98; 411/432

[56] References Cited

U.S. PATENT DOCUMENTS

| | | | |
|---|---|---|---|
| 981,113 | 1/1911 | Richards | 248/422 X |
| 1,039,960 | 10/1912 | Klein, Sr. et al. | 254/103 |
| 1,275,971 | 8/1918 | Michelin | 254/103 X |
| 1,447,603 | 3/1923 | Runner | 254/103 X |
| 2,201,826 | 5/1940 | Ditchfield | 248/200 |
| 2,477,466 | 7/1949 | Richardson | 403/384 X |
| 2,535,613 | 12/1950 | Vanderbeek | 248/188.4 |
| 2,583,923 | 1/1952 | Anschuetz . | |
| 3,148,795 | 9/1964 | Leach | 254/45 X |
| 3,338,554 | 8/1967 | Gostomski | 254/45 X |
| 3,549,027 | 12/1970 | Batson | 214/38 |
| 3,567,271 | 3/1971 | Gostomski | 254/45 X |
| 3,640,502 | 2/1972 | Bargman | 254/45 X |
| 3,709,467 | 1/1973 | Mann | 254/45 |
| 3,758,074 | 9/1973 | Jeffries et al. | 254/45 |
| 3,897,044 | 7/1975 | Tallman | 254/45 |
| 4,015,822 | 4/1977 | Rasmussen | 254/45 |
| 4,169,581 | 10/1979 | Thurmond | 254/45 |
| 4,872,903 | 10/1989 | Periou | 74/89.15 |
| 4,930,270 | 6/1990 | Bevacqua | 248/357 X |
| 5,199,738 | 4/1993 | VanDenberg | 248/188.4 X |
| 5,273,256 | 12/1993 | Chambers | 254/45 |

FOREIGN PATENT DOCUMENTS

| | | | |
|---|---|---|---|
| 1088640 | 3/1957 | France | 254/103 |
| 1562197 | 4/1969 | France | 248/354.3 |

OTHER PUBLICATIONS

Atwood Industries, Inc. Product Brochure, Form No. BR-1043, 1992.
Atwood Industries, Inc. Product Brochure, Form No. TS-2000, 1993 (estimated).
Atwood Industries, Inc. Product Brochure, Form No. TS-2002, 1993 (estimated).
Happijac Company Product Brochure, 1993 (estimated).
Rieco, Inc. Camper Jacks Product Brochure, 1980 (estimated).
Rieco, Inc. Swing-A-Way Bracket Product Brochure, 1980 (estimated).
Rieco, Inc. Ball Screw Camper Jacks Product Brochure, 1993 (estimated).
Rieco, Inc. Remote Controlled Electric Camper Jacks Product Brochure, 1992 (est.).
Titan Jack, Inc. 4-Corner Camper Jack Product Brochure, 1993 (estimated).

*Primary Examiner*—Karen J. Chotkowski
*Attorney, Agent, or Firm*—Workman Nydegger Seeley

[57] ABSTRACT

A novel mechanical camper jack for mounting on a camper body is disclosed. The jack has an outer jack housing, which mounts to the camper body, and is slidably telescoped over a jack leg. Extension and retraction of the camper jack leg is accomplished with rotation of a lead screw that is threaded through a plastic nut mounted within the jack leg. Rotation of the lead screw is effected by the operation of a right-angled gear assembly, disposed within the jack housing. The gear assembly is operated with a hand crank, which is detachably mounted to the jack via a socket assembly. In one embodiment, the hand crank is provided with a ratchet and paul mechanism. The socket is implemented so that the coupling between the hand crank and the gear assembly occurs completely within the jack housing. In this way, the socket extends through the wall of the jack housing in a manner so as to be substantially flush with the exterior surface of the jack housing. In a preferred embodiment, the plastic nut is used in combination with a steel safety nut and a plastic wear guide.

27 Claims, 7 Drawing Sheets

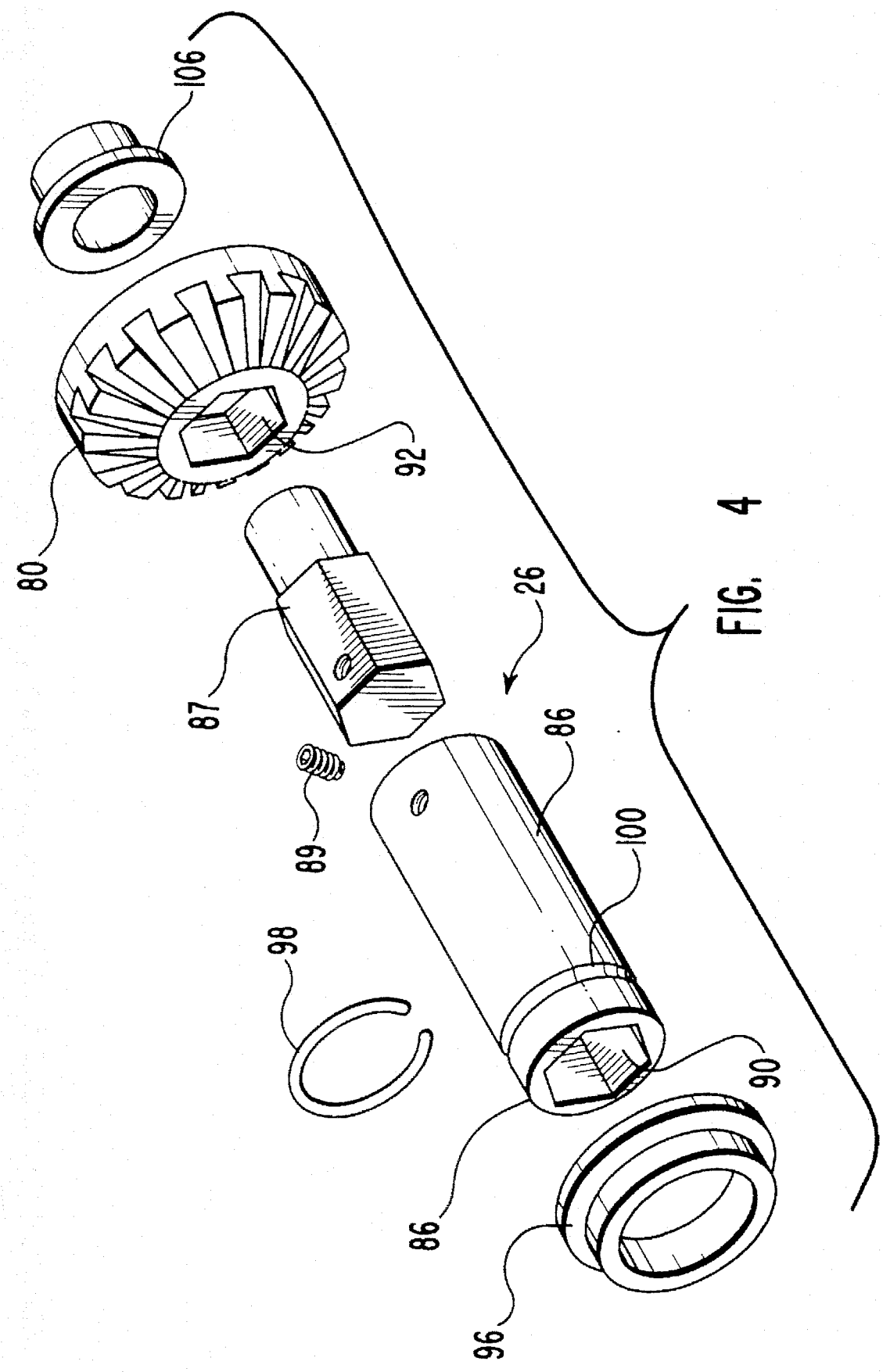

MECHANICAL CAMPER JACK

RELATED APPLICATION INFORMATION

This application is a continuation-in-part of United States application Ser. No. 07/983,073, filed Nov. 30, 1992, now U.S. Pat. No. 5,348,258 incorporated herein by reference.

BACKGROUND OF THE INVENTION

1. Field of the Invention.

The present invention relates to devices for raising, lowering and/or leveling a camper body. More particularly, the present invention relates to a novel camper jack that is implemented so as to present a reduced and streamlined profile for improved safety and visibility when the jack is mounted to a camper body, while at the same time providing a jack that is efficient and economical.

2. Prior State of the Art

Camper jacks are commonly used to raise, lower and support camper bodies and are especially prevalent with those types of camper bodies which rest in the bed of a pick-up truck. Typically, jacks of this type have an outer housing portion which is permanently mounted at each corner of the camper body. Disposed within the housing is a leg portion, which can be extended or retracted in a telescoping fashion by operating the jack's lifting mechanism. Thus, when the camper body is to be removed from the truck, each of jack legs are extended to the ground, and then further advanced so as to lift the camper body from the bed of the truck. The truck can then be driven out from beneath the camper. When the camper is to be mounted to the truck bed, the process is reversed.

There are currently available a wide variety of camper jack implementations, but generally camper jacks are based on either of a hydraulic or a mechanical design. Hydraulic jacks are generally easy to operate and are capable of lifting and supporting heavy loads. However, some hydraulic jacks are also subject to a several undesirable drawbacks. Because a hydraulic system is utilized to generate the lifting force of the jack, some hydraulic jacks are susceptible to seal failure and fluid leakage—conditions which can cause decreased jack performance and/or failure. Further, as is well known, certain hydraulic jacks must be secured, or locked in place when a load is being supported, so as to prevent the load from swaying or drifting to the ground over time. Consequently, these hydraulic jacks may not be suitable for long-term support/storage of a camper body. Hydraulic systems can also be negatively affected by extreme temperatures, and thus some hydraulic jacks may not operate satisfactorily under certain cold or warm weather conditions. Finally, the components used in a hydraulic system are expensive, which results in a relatively expensive camper jack.

Some of the problems inherent in some hydraulic systems have been addressed by designing camper jacks which use only mechanical components. Typically, a jack of the mechanical variety generates a lifting force by way of screw and nut mechanism. Actuation of the leg jack is effected by turning a hand crank, which acts through a gearing assembly to rotate a lead screw. This lead screw is threaded through a nut, typically constructed of steel, brass or bronze, which is non-rotatably attached to the jack leg. When the lead screw is rotated, the nut travels upwardly or downwardly along the screw, thereby causing the jack leg to be retracted or extended.

Mechanical jacks of this type are not without drawbacks either. A metal screw and steel nut arrangement is slower and less efficient and thus more difficult to operate than is a hydraulic system for raising and lowering heavy loads. In order to more closely approximate the efficient and smooth lifting characteristics of the hydraulic jack, mechanical screw jacks have been designed to utilize a sophisticated—and therefore expensive—ball screw technology, wherein a ball screw is threaded through a ball nut. As is well known, the ball nut contains a train of ball bearings which, when the ball screw is rotated, circulate within the nut and around the screw so as to reduce the friction between the two. This arrangement approximates the efficiency and ease of use found in a hydraulic jack. But, because of the complexity and number of parts required for the ball screw arrangement, a ball screw jack is usually significantly more expensive than a mechanical jack using a standard metal screw and nut arrangement.

Hydraulic and mechanical jacks that are currently available also suffer from a common drawback. As discussed, camper jacks are usually mounted permanently to the camper body. Operation of the jack is usually accomplished by manual operation of a hand crank or pump attachment. These hand operable attachments are either permanently attached to the jack, or are detachably mounted to the jack itself via an external mounting assembly, such as a socket housing, which is in turn is operatively coupled to the internal gear or hydraulic portion of the jack. In either scenario, the hand operable attachment itself, or the external mounting assembly for detachably receiving such an attachment, is not flush with the exterior surface of the jack housing. Instead, the attachment and/or the mounting assembly protrudes out from the camper jack housing. This characteristic can be quite hazardous.

For instance, camper jacks of this type can hinder the driver's view—as for instance through a rear-view mirror—when the camper is mounted to the truck bed. Also, the driver must be cognizant of the additional width of the camper body caused by the camper jack, and the potential for accidental collision is increased—especially when maneuvering in tight spaces.

Camper jacks having attachments or attachment housings that protrude from the jack housing can be especially hazardous to pedestrians or bicyclists, who can be inadvertently struck by the protrusion. The problem is exacerbated by the fact that the camper jack is usually at head level, which increases the risk of serious injury, and by the fact that the protruding part is often difficult to see and avoid. Further, the hazard is present both when the camper body is stationary, as for instance in a crowded campground or along a busy road, and when the camper body is mobile, as for instance along narrow, crowded streets. This problem is of heightened concern in areas where streets are extremely narrow and there are a large number of pedestrians, bicyclists and/or other motor vehicles, such as may be found in many European and Asian countries.

Therefore, there is a need for a camper jack that not only is efficient, easy to use and low in cost, but which does not utilize attachments or attachment housings that extend out from the jack when mounted to the camper body. The present invention addresses this need.

OBJECTS AND BRIEF SUMMARY OF THE INVENTION

The present invention has been developed in response to the present state of the art, and in particular, in response to the problems and needs in the art not heretofore fully or completely solved by currently available camper jacks. Thus, it is an overall object of the present invention to provide a mechanical camper jack that is capable of raising and lowering camper bodies and that is not subject to the problems that can be encountered with jacks using hydraulic or ball and screw systems.

It is another important object of the present invention to provide a mechanical camper jack that provides a low, streamlined profile in conjunction with the camper body to which it is attached, and more specifically, that does not have any protruding attachments or attachment housings.

Yet another object of the present invention is to provide a mechanical camper jack that can not only lift and support large loads smoothly, efficiently and safely, but which utilizes low-cost components.

Additional objects and advantages of the present invention will become more fully apparent from the following more detailed description taken in conjunction with the drawings and claims, or may be learned by the practice of the invention.

Briefly summarized, the foregoing and other objects are achieved with a novel mechanical camper jack. The camper jack has an outer jack housing, which mounts to a camper body and is slidably telescoped over a jack leg. Importantly, the cross-sectional profile of the jack housing is uniform across its entire length, and it therefore presents a substantially uniform profile when mounted to the camper body.

The extension and retraction of the camper jack leg is accomplished via the rotation of a lead screw that is threaded through a plastic nut mounted to the jack leg. Surprisingly, the plastic nut provides for the smooth and efficient rotation of the lead screw, resulting in a jack that approximates the efficiency and ease-of-use provided by a ball screw jack, but at much lower cost. Further, the plastic nut is capable of raising and supporting heavy camper loads. In a preferred embodiment of the invention, the plastic nut is used in connection with a loosely threaded steel safety nut, which contributes to the overall safety of the jack. Also, the plastic nut preferably has mounted thereon a plastic wear guide, which further increases the efficiency of the jack by preventing any metal-to-metal contact when the jack leg moves within the jack housing.

Rotation of the lead screw is effected by the operation of a right-angled gear assembly. The entire gear assembly is disposed completely within the jack housing so as to maintain the uniform cross-sectional profile of the jack. The gear assembly is operated with a crank means for effecting the rotation of the lead screw, which is detachably mounted to the jack via a socket means. In the preferred embodiment, the crank means is provided with a ratchet and pawl mechanism, thereby permitting for an easier and more efficient operation of the camper jack.

Importantly, the socket means not only provides a means for detachably coupling the crank means to the gear assembly, but it does so in a manner such that the coupling occurs completely within the jack housing. Further, the socket means is connected directly to the gear assembly and is not attached as an external piece. In this way, the socket means only extends through the wall of the jack housing in a manner so as to be substantially flush with the exterior surface of the jack housing. Thus, once the crank means is detached, the socket means does not protrude outwardly from the jack housing, and again, the substantially uniform cross-sectional profile presented by the jack housing is maintained. Advantageously, the camper jack of the present invention does not have the hard-to-see, obtrusive attachment or attachment housing that is found on existing jacks, and thus it eliminates the hazards that can result therefrom.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are therefore not to be considered limiting of its scope, the invention in its presently understood best mode for making and using the same will be described with additional specificity and detail through the use of the accompanying drawings in which:

FIG. 4 is an exploded perspective view illustrating the integral attachment of the socket to the bevel gear.

DETAILED DESCRIPTION OF THE PRESENTLY PREFERRED EMBODIMENTS

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Figure 1:
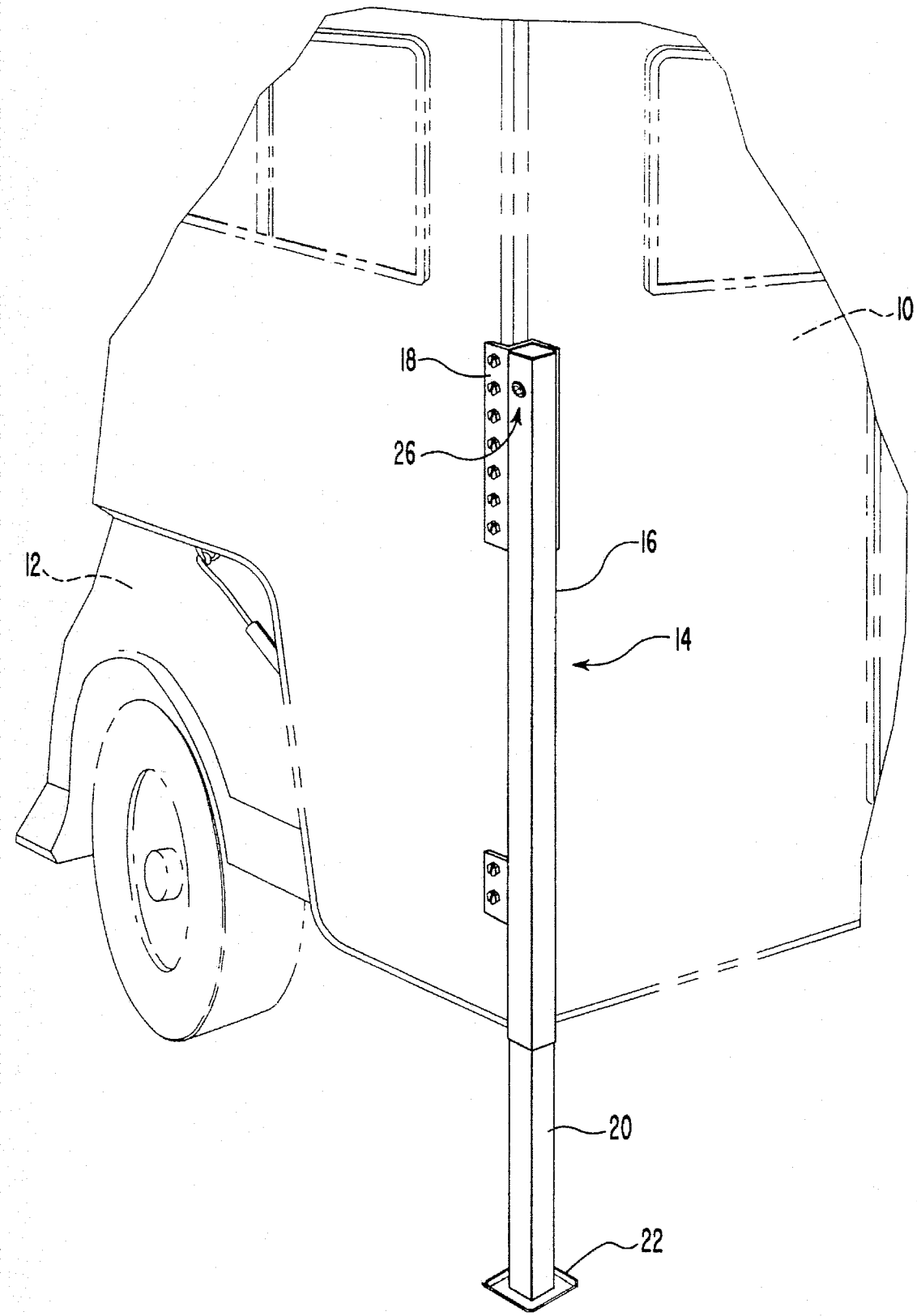
FIG. 1 is a perspective view of the camper jack of the present invention mounted to one corner of a camper body.

Referring now to FIG. 1, a camper body 10 is illustrated as resting in the bed of a truck 12. At one corner of the camper body 10 is a camper jack assembly of the present invention, designated generally at 14. The camper jack 14 includes an exterior jack housing 16, which is adapted to be rigidly mounted to the camper body 10 by way of a bracket 18. Telescoping slidably into the jack housing 16 is an elongate, hollow jack leg 20. Affixed to the lower end of the jack leg 20 is a base plate 22, which engages the ground when the jack leg 20 is fully extended. A crank means for effecting the rotation of a lead screw 28 (shown in FIG. 2) disposed within the jack 14, as for example a hand crank 24 (shown in FIG. 2), is detachably mounted to the jack assembly via a socket means, such as the socket, generally designated at 26. Manual operation of the hand crank 24 actuates the extension or retraction of the jack leg 20, as will be discussed in more detail below.

In use, a camper jack 14 is positioned at each corner of the camper body 10. When the camper 10 is positioned within the truck bed 12, the jack leg 20 of each jack assembly 14 is retracted upwardly within the jack housing 16 and is located such that the base plate 22 is spaced a sufficient distance above the ground so as to provide clearance during travel of the truck. When the camper 10 is to be removed from the truck, hand crank 24 is attached to jack assembly 14 via socket assembly 26, and then used to lower the jack leg 20 relative to the jack housing 16 until the base plate 22 is in contact with the ground. Thereafter, a force is applied against the jack leg 20, through operation of the hand crank 24, so as to cause the jack housing 16 to move upwardly relative to the jack leg 20, which in turn causes the camper to be lifted from the truck bed 12. This process is repeated for each of the camper jacks that are mounted to the camper 10, until the camper is completely supported by the series of camper jacks 14. The truck can then be driven from underneath the camper body 10. When the camper body 10 is to be remounted to the truck bed 12, the process is reversed.

Figure 2:
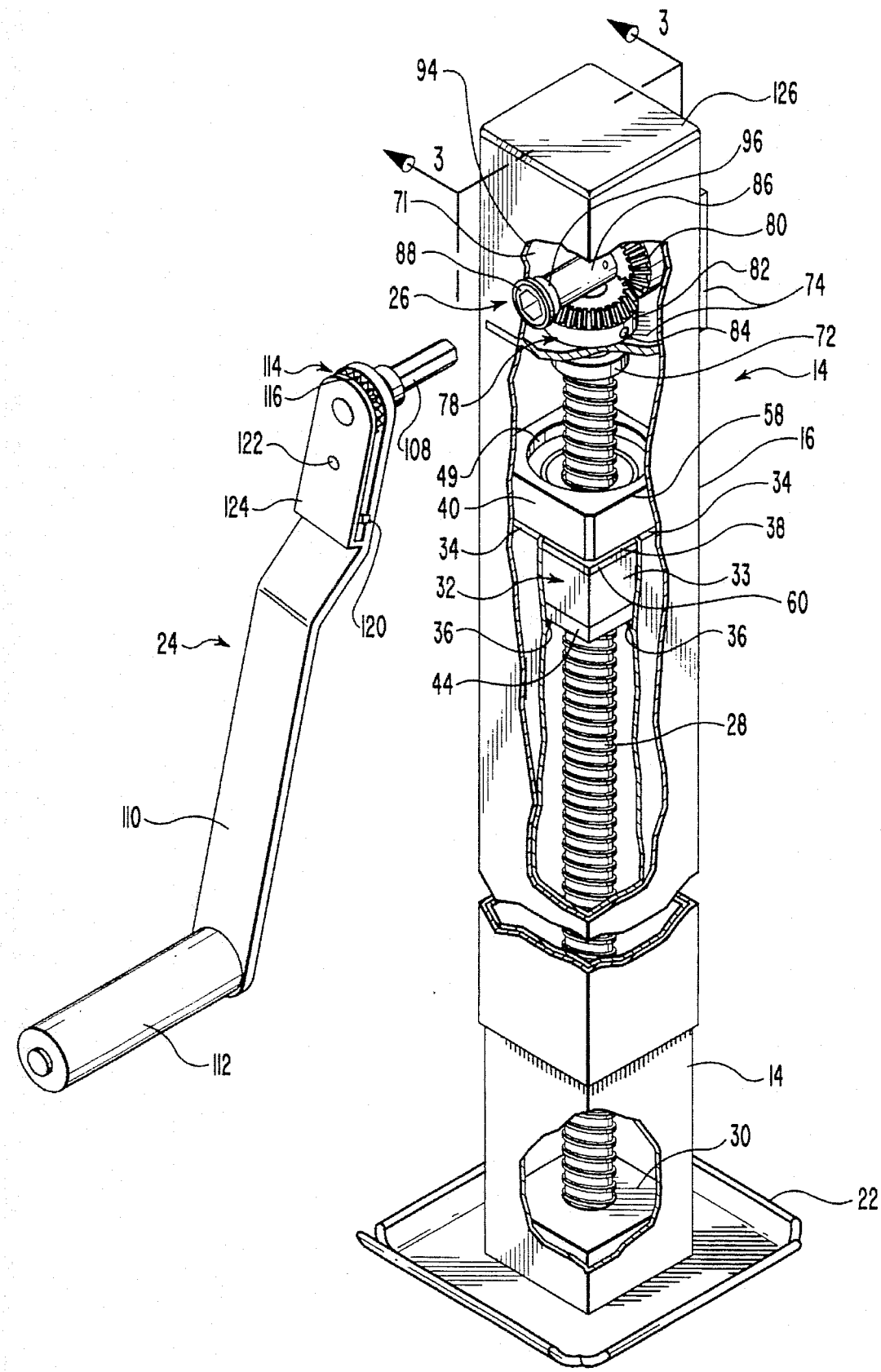
FIG. 2 is a perspective view of the camper jack and hand crank, illustrating the internal components of the camper jack.

As can be seen in FIGS. 1 and 2, the jack housing 16 has a cross-section that is substantially uniform along its entire length. Further, as can best be seen in FIG. 1, the rectangular shape of the jack housing 16 presents a streamlined profile in conjunction with the camper body 10. Although in the preferred embodiment the jack housing 16 and the jack leg 20 have a rectangular cross-section, it will be appreciated that different geometric shapes fall within the intended scope of the invention, including a jack housing 16 that has a circular cross-section.

As is further shown in FIGS. 1 and 2, the socket 26, which will be discussed in further detail below, is implemented such that it extends through the wall of the jack housing 16 in a manner so as to be substantially flush with the exterior surface of the jack housing 16. Importantly, this maintains the substantially uniform cross-section presented by the jack housing 16 and, consequently, once the hand crank 24 is removed from the jack 14, the jack housing 16 presents a flush profile. As such, and because no portion of the socket assembly 26 protrudes outwardly from the jack housing 16, the camper jack 14 is much safer than currently available jacks because the hazards and various safety concerns associated with outwardly projecting attachments or attachment housings, as for example an external socket, are eliminated.

Figure 3:
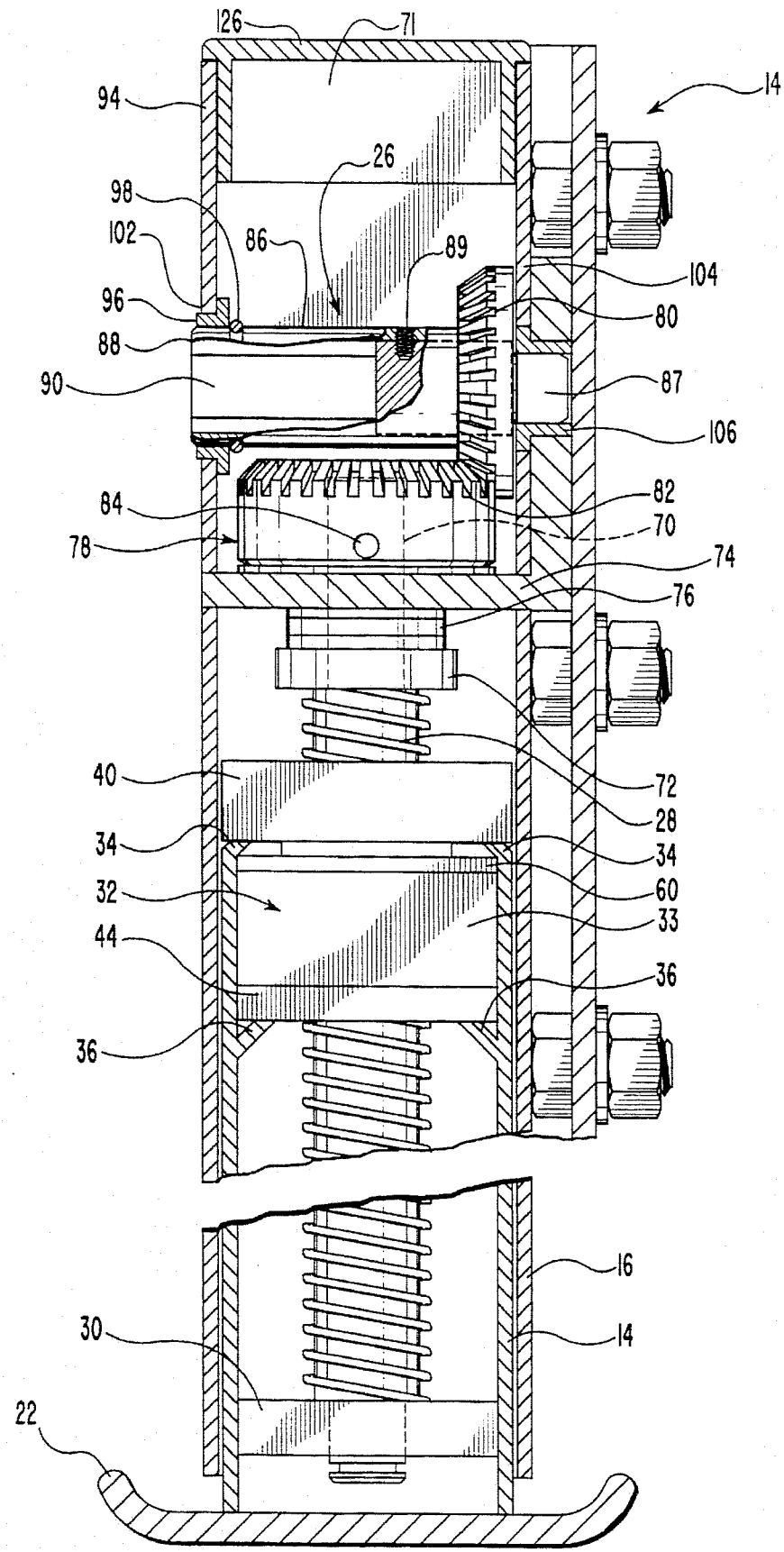
FIG. 3 is a cross-sectional view of the camper jack taken along line 3—3 of FIG. 2.

Referring now to FIGS. 2 and 3 together, the internal components of the jack assembly 14 are shown. Illustrated is the manner in which the jack leg 20 is received within the jack housing 16 so as to be telescoped slidably therein. The extension and retraction of the jack leg relative to the jack housing 16 is effected in response to the rotation of an elongated lead screw 28. Lead screw 28 extends along a substantial length of the jack 14, and is disposed within the Jack housing 16 and the jack leg 20. The screw is supported so as to be capable of rotation relative to the jack leg 20, but it is prevented from moving axially within the jack leg 20 by a plastic washer 30, fastened to a distal end portion of the lead screw 28.

Figure 5A:
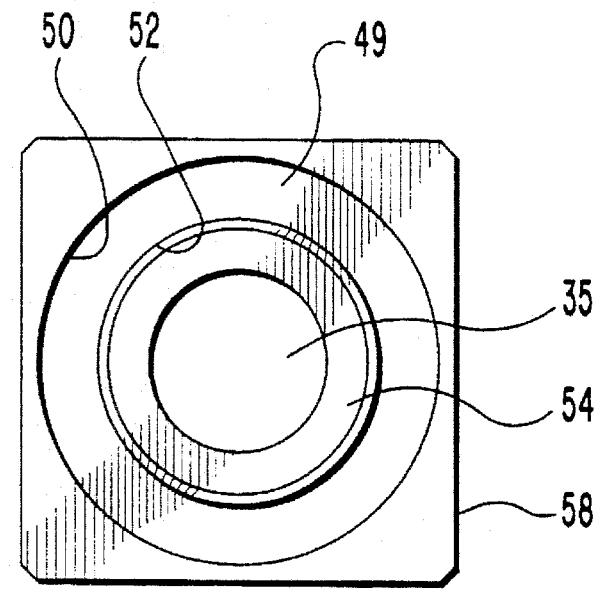
FIG. 5A is a top plan view of the DELRIN® plastic nut of FIGS. 2 and 3.

As is further shown in FIGS. 2 and 3, lead screw 28 is threaded through a nut assembly, designated generally at 32. Nut assembly 32 is comprised of a nut 33 which is constructed of a plastic or nylon material. In the preferred embodiment, nut 33 is constructed from the plastic known by the tradename DELRIN®, which is a product of E. I. DuPont de Nemours & Co., Inc. It will be appreciated that alternative plastic or nylon materials having similar properties could also be used. Nut 33 has a threaded bore 35 passing therethrough (shown in FIG. 5A) that is capable of threadedly engaging the lead screw 28.

It has been found by the inventor that by utilizing a nut 33 constructed from the DELRIN®, or another similar material, a number of surprising and desireable characteristics are realized in jack 14. These advantages were heretofore only believed to be available in more expensive hydraulic and/or ball and screw jacks. First, nut 33 allows for a very smooth and efficient rotation of the lead screw 28. This results in a camper jack 14 that is extremely efficient and which has an ease of operation that was only previously available in a hydraulic jack, or in a mechanical jack utilizing a ball screw technology. Further, the nut 33 is self-locking, and thus, unlike many jacks that utilize hydraulics or ball screw technologies, there is no need for a separate locking or braking mechanism when the jack 14 is supporting a heavy load. Also, and unlike many hydraulic jacks, the jack 14 will not drift over time. At the same time, nut 33 is extremely strong, and is thus capable of supporting even the largest camper loads. Finally, nut 33 provides these advantages, and yet, because it is constructed from a material that is inexpensive, it allows for a jack assembly 14 that is much less expensive than a comparable ball screw or hydraulic camper jack.

As FIGS. 2 and 3 further illustrate, the nut assembly 32 is located within the jack leg 20 adjacent its upper end. The nut assembly 32 is held within the jack leg 20 by the combination of a crimp 34, formed along the inner periphery of the jack leg 20, and an angular projection 36, also formed along the inner periphery of the jack leg 20. In this manner, the nut assembly 32 is prevented from moving longitudinally relative to the jack leg 20. The nut assembly 32 must also be held so as to not rotate relative to the jack leg 20. This is accomplished in the preferred embodiment by utilizing a nut assembly 32 which has an outer periphery 38 that is rectangular in cross-section (also shown in FIGS. 5B and 6B), and which tightly, and non-rotatably fits within the rectangular jack leg 20.

In one preferred embodiment that is illustrated in FIGS. 2 and 3, the nut assembly 32 further includes, in combination with the nut 33, a safety means for providing a backup threaded engagement for the lead screw in the event the threaded engagement between the nut and the lead screw fails, as for example safety nut 44, a guide means for preventing contact between the jack housing and the jack leg, as for example wear guide 40, and a steel reinforcement plate 60. The nut assembly 32 of this embodiment is better illustrated in FIGS. 5A and 5B, to which reference is now made.

The wear guide 40 is a rectangular piece, preferably comprised of a polyurethane or similar material, which is affixed to the top of the nut 33. Formed through the center of the wear guide 40 is a cylindrical hole 49 having a first diameter 50 and a smaller second diameter 52. The transition between the first and second diameter portions 50, 52 of the cylindrical hole 49 forms a flat shoulder portion 54. Formed on the top of the cylindrical portion 46 of the nut 33 is a cylindrical flange 48. Thus, in the preferred embodiment, the wear guide 40 can be affixed to the nut 33 by "snapping" guide 40 onto the cylindrical portion 46 of the nut 33. The guide 40 is held firmly in place by the cylindrical flange 48 and a second shoulder portion 56 that is formed on the nut 33. It will be appreciated that the wear guide 40 could be affixed to the nut 33 in a variety of different ways, and could even be formed as an integral part of the nut 33.

The wear guide 40 also has an outer periphery 58 that is rectangular (seen in FIG. 2 and in the top plan view of FIG.

5A) and that is sized so as to fit snugly within the rectangular interior defined by the jack housing 16. This fit is best shown in FIG. 3. Importantly, the wear guide 40 thus prevents the jack leg 20 from rubbing directly against the inner surface of the jack housing 16, and thereby protects against any damaging metal-to-metal contact. Often, when a side force is applied to a camper body, or if the camper is being supported on an uneven ground surface, the jack leg 20 can "bind" against the inner surface of the jack housing 16. However, because the wear guide 40 is in place, it imparts a much lower coefficient of friction between the jack leg 20 and the jack housing 16 than would be present if metal surfaces were in direct contact. This greatly reduces any "binding" effect, and contributes to an overall more efficient and versatile jack 14.

Figure 5B:
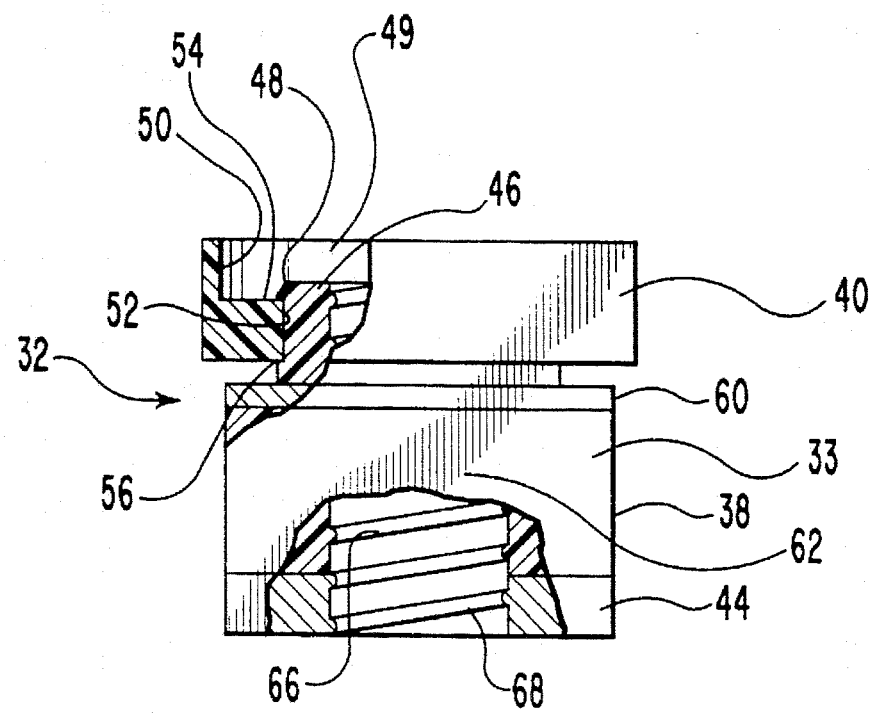
FIG. 5B is a side elevation view of the DELRIN® plastic nut of FIG. 5A.

With continued reference to FIG. 5B, nut assembly 32 further includes a steel plate 60, positioned on the top of the rectangular portion of the nut body 62. This steel plate 60 enhances the structural rigidity of the nut assembly 32, and insures that the nut assembly 32 is more firmly held in place within the jack leg 20 by the first crimp 34 discussed above and shown in FIGS. 2 and 3.

FIG. 5B also illustrates how the nut assembly 32 also preferably comprises a steel safety nut 44, affixed to the bottom portion of the nut body 62. The safety nut 44 acts as a backup to the nut 33, and will engage the threads of the lead screw 28 only in the event that the threads 66 of the nut 33 fail. Consequently, in normal operation the threads 68 of the safety nut 64, which are larger than the threads 66 of the nut 33, will not be in a threaded engagement with the lead screw 28, and thus will not hinder the efficient operation of the jack 14. In this way, the safety nut 44 contributes to the overall safety of the camper jack 14.

Figure 6A:
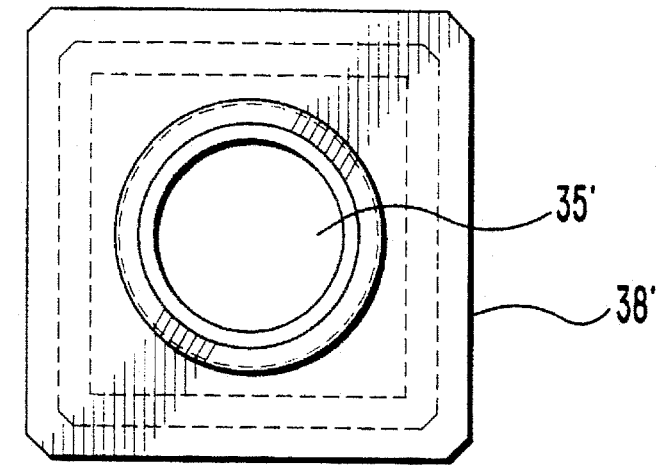
FIG. 6A is a top plan view of an alternative DELRIN® plastic nut.
Figure 6B:
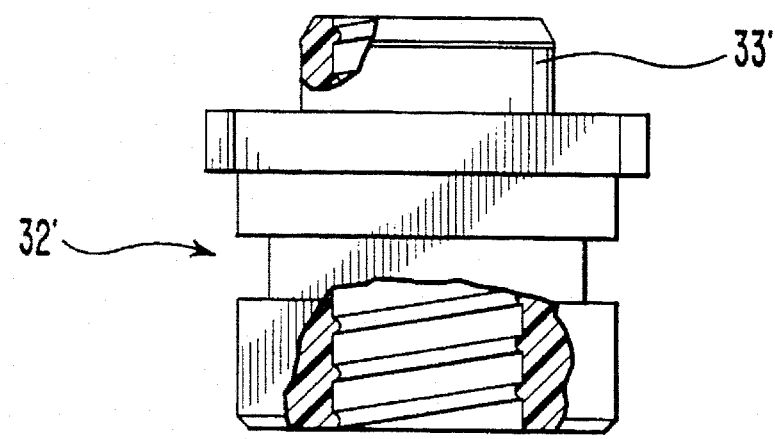
FIG. 6B is a side elevation view of the DELRIN® plastic nut of FIG. 6A.

It will be appreciated that the nut assembly 32 can optionally be comprised of a single nut 33', without any additional components. This embodiment is illustrated in FIGS. 6A and 6B. Like the nut assembly 32 illustrated in FIGS. 2, 3 and 5A–5B, nut 33' is also comprised of plastic, such as DELRIN®, and has a threaded bore 35' that threadedly engages the lead screw 28. Further, nut 33' has a rectangular outer periphery 38' that is received within the correspondingly shaped jack leg 20.

Referring again to FIGS. 2 and 3, the upper end of the lead screw 28 comprises an extension shaft 70 of reduced diameter (shown in dotted lines in FIG. 3), which has force fitted thereon a thrust washer 72. Affixed within the jack housing 16 is a bearing plate 74 comprised of a steel plate, which forms a gear compartment 71 within the upper end of the jack housing 16. As shown in FIG. 3, the bearing plate 74 is "L" shaped, and is welded so as to be partially disposed within the jack housing 16. A portion of the bearing plate 74 is also external to the jack housing 16 so as to be flush with the exterior surface thereof. The shaft 70 extends through the bearing plate 74, and sandwiched directly between the thrust washer 72 and the bearing plate 74 is a thrust bearing 76, which reduces friction and facilitates the rotation of the lead screw 28 when the jack 14 is supporting a load.

Disposed within the gear compartment 71 is a gear means for causing the lead screw to be rotated, as for example a right-angled gear assembly, designated generally at 78. The right-angled gear assembly 78 is comprised of a first bevel gear 80 which meshes with a second bevel gear 82. As can be seen in FIG. 3, the second bevel gear 82 is directly coupled to the shaft 70 portion of the lead screw 28 by a radial pin 84.

With continued reference to FIG. 3, it is shown how the first bevel gear 80 is coupled directly to the socket 26. Socket 26 acts as a means for detachably coupling the hand crank 24 to the gear assembly 78 in a manner such that the coupling occurs within the jack housing 16. As is shown, the socket 26 is connected to the first bevel gear 80. The manner in which this attachment is done best shown in FIG. 4. Socket 26 comprises, for example, a female socket 86 and a shaft 87. Formed completely through the longitudinal length of the female socket 86 is a socket bore 90. Bore 90 has a polygonal cross-sectional shape, which in the preferred embodiment is hexagonal. As is further shown, a portion of the outer periphery of the shaft 87 is also hexagonal so as to be partially received within the bore 90. The female socket 86 is then secured to the shaft 87 by way of a roll pin 89 as shown, or by welding, soldering or similar techniques. The first bevel gear 80 also has a bore 92 having the same polygonal cross-sectional shape as socket bore 90, and which can thus receive, and mount to the similarly shaped portion of the shaft 87. In this way, the socket 26 is formed so as to be integral with the first bevel gear 80. It will be m appreciated that there are various alternative ways in which the socket assembly can be connected to the bevel gear in an FIGS. 3 and 4 taken together illustrate how the socket 26 and bevel gear 80 are together mounted within the jack housing 16. The open end 88 of the female socket 86 extends through a wall 94 of the jack housing 16, and is rotatably supported therein with a bushing 96 that extends around the circumference of the female socket 86. The female socket 86 is further held in place by a ring 98 disposed within a channel 100 formed around the female socket 86 circumference (FIG. 4). The open end 88 is substantially flush with the exterior surface 102 of the jack housing 16, extending out from the surface 102 approximately one-sixteenth of an inch.

As FIG. 3 further illustrates, the shaft 87 extends completely through the first bevel gear 80 and through the back wall 104 of the jack housing 16 and the portion of the bearing plate 74 that is affixed to the back wall 104. The circular portion of the shaft 87 is rotatably held within the back wall 104 by a second bushing 106 formed around the circumference of the shaft 87. Thus, rotation of the female socket 86 causes a corresponding rotation of the first bevel gear 80 via the shaft 87.

As FIG. 2 denotes, the means for effecting the rotation of the lead screw, as for example hand crank 24, comprises a male socket connector 108 that can be detachably received into the open end 88 of the female socket 86 and within the socket bore 90. Therefore, the cross-sectional shape of the male socket connector 108 is hexagonal so as to conform with the cross-sectional shape of the bore 90. It will be appreciated that, in the alternative, the female socket could be disposed on the hand crank, and the male socket connector disposed within the jack housing and connected to the gear assembly so as to effect the detachable coupling of the hand crank to the gear assembly.

Hand crank 24 further comprises a lever arm 110 that is operatively attached to the male socket connector 108. Lever arm 110 has attached at its opposite end a handle 112. With this arrangement manual rotation of the crank 24 causes rotation of the female socket 86 and the shaft 87. The latter acts through the gears 80 and 82 and the shaft 70 to rotate the lead screw 28. When the crank is turned to rotate the screw 28 in one direction, the screw coacts with the nut 33 to cause the jack leg 20 to move upwardly out of contact with the ground and to a retracted or stored position. Turning of the crank to rotate the screw in the opposite direction shifts the jack leg 20 downwardly until the base plate 22 engages the ground. Thereafter, continued turning of the crank and rotation of the screw cause the jack housing 16 to shift upwardly and lift the camper body 10 from the truck bed 12.

Figure 7:
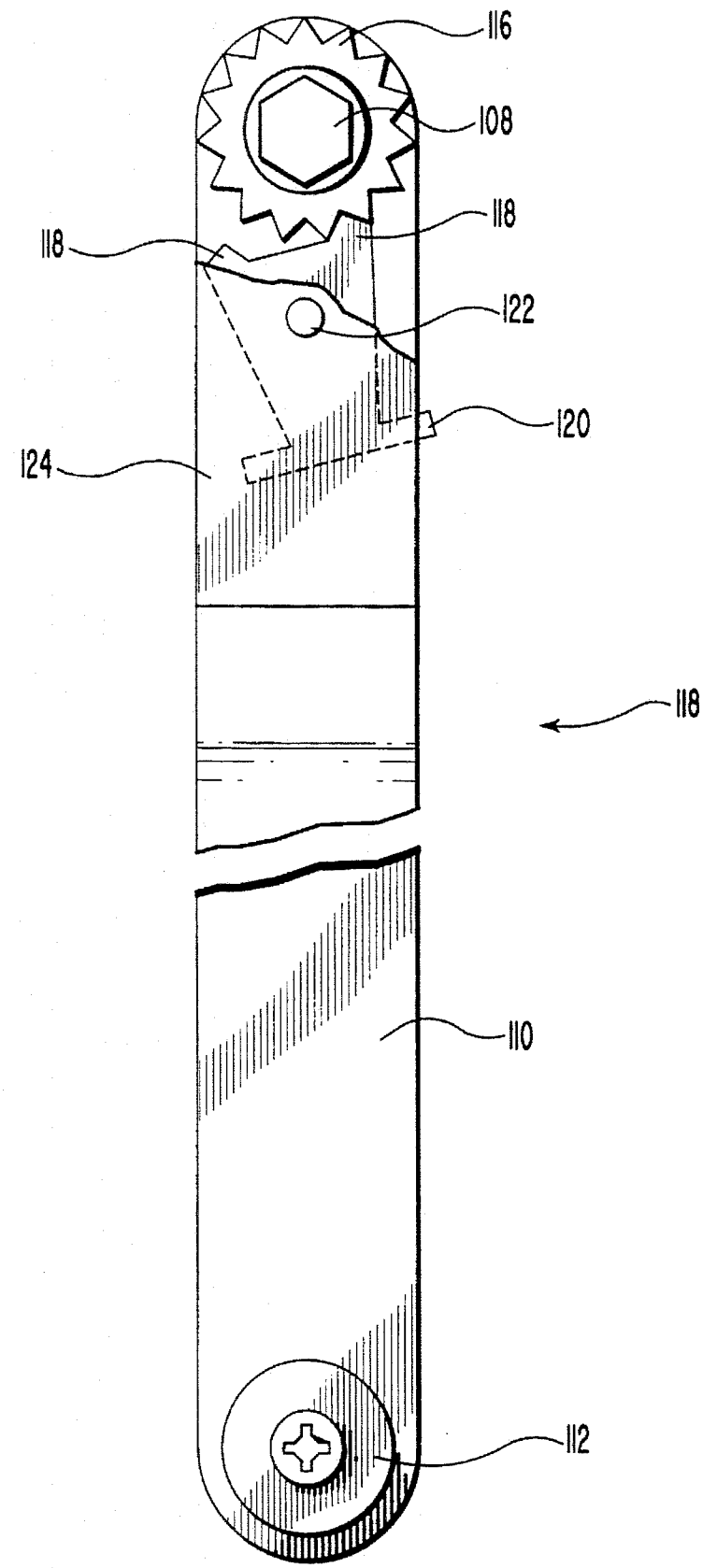
FIG. 7 is a cross-sectional view showing the ratchet and pawl mechanism of the hand crank in FIG. 2.

As is shown in FIG. 2, the lever arm 110 is operatively coupled to the male socket connector 108 preferably by way of a ratchet and pawl mechanism, designated generally at 114. This arrangement is best illustrated in FIG. 7. There it is shown how ratchet and pawl mechanism 114 comprises a ratchet wheel 116 and a pawl 118 which is in engagement with the ratchet wheel 116. Pawl 118 further has a lever arm 120 which can be operated by the user. Actuation of the lever arm 120 places the pawl 118 in either a first or a second position via a movement about radial pin 122. The ratchet and pawl mechanism 114 thereby allows for the rotation of the male socket connection 108 in one direction but not the other, depending on the position of the lever arm 120. The ratchet and pawl mechanism 114 is mounted to the lever arm 110 and placed within housing 124.

As is well known, the ratchet and pawl mechanism 114 allows the hand crank 24 to produce rotation in a desired direction and to disengage in the opposite direction. Thus, the hand crank 24 does not need to be operated in a 360 degree arc in order to raise or lower a load. In this way, a hand crank 24 having a longer lever arm 110 can be utilized, which in the preferred embodiment is approximately fourteen inches. The ability to use a hand crank with a longer lever arm 110 results in a more efficient and easier to operate jack 14. For instance, the longer lever arm 110 provides greater efficiency in raising or lowering the jack 14, thereby allowing persons of lessor strength to raise and lower even large campers. Further, because the lever arm 110 does not need to be operated in a 360 degree arc due to the ratchet a pawl assembly, and because of the longer lever arm 110, shorter persons can easily operate the jack 14, even when the jack is in a fully extended position.

Although in the preferred embodiment the means for effecting the rotation of the lead screw 28 comprises a hand crank 24, it will be appreciated that other equivalent structure falls within the intended scope of the invention. For instance, an electric motor could be used to cause rotation of the bevel gears by being directly coupled to the female socket 26. Alternatively, the top end of the jack housing 16 has a removable cap 126 (FIG. 2) that can be removed. An electric motor could thereby be inserted within the jack housing 16, and operatively coupled directly to the right-angled gear assembly 78 so as to effect rotation of the lead screw 28.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. An extensible camper jack comprising:

a jack housing adapted to be affixed to a load to be raised or lowered;

a jack leg, slidably received within the jack housing so as to be moveable in a telescoping fashion therein;

a threaded nut mounted to the jack leg in a manner so as to be held against rotation relative to the jack leg;

an elongate lead screw threadedly received by the nut such that rotation of the lead screw causes the nut to move axially along the lead screw, thereby causing the jack leg to move in the telescoping manner within the jack housing;

gear means, completely disposed within the jack housing, for rotating the lead screw;

crank means for effecting the rotation of the lead screw; and socket means, coupled to the gear means, for detachably coupling the crank means to the gear means, said socket means being configured such that:

the coupling of the crank means and the gear means occurs inside the jack housing, and the socket means extends through a portion of an outer wall of the jack housing in a manner that maintains said portion of the outer wall substantially flush with adjacent portions of the outer wall so that said portion does not protrude outwardly.

2. An extensible jack as defined in claim 1, wherein the threaded nut is comprised of a plastic material.

3. An extensible jack as defined in claim 1, wherein the threaded nut further comprises safety means for providing a backup threaded engagement for the lead screw in the event the threaded engagement between the threaded nut and the lead screw fails.

4. An extensible jack as defined in claim 1, wherein the threaded nut further comprises guide means for preventing contact between the jack housing and the jack leg.

5. An extensible jack as defined in claim 4, wherein the guide means comprises a wear guide, affixed to the threaded nut and having an outer periphery that is in slidable contact with an interior wall of the jack housing so as to prevent contact between the jack housing and the jack leg.

6. An extensible jack as defined in claim 1, wherein the crank means comprises a manually operable hand crank.

7. An extensible jack as defined in claim 6, wherein the hand crank comprises a ratchet and pawl mechanism such that the hand crank may be selectively rotated only in a single preselected direction to effect rotation of the lead screw.

8. An extensible jack as defined in claim 1, wherein the jack housing has a substantially uniform cross-section along the entire length of the jack housing.

9. An extensible jack as defined in claims 8, wherein the substantially uniform cross-section is rectangular in shape.

10. An extensible jack as defined in claim 1, wherein the gear means comprises a right-angled gear assembly having a first bevel gear meshed with a second bevel gear, the second bevel gear being connected to the lead screw.

11. An extensible jack as defined in claim 1, wherein the socket means comprises a female socket capable of detachably receiving a correspondingly shaped male socket connector operatively coupled to the crank means.

12. An extensible camper jack comprising:

a jack housing adapted to be affixed to a load to be raised or lowered;

a jack leg, slidably received within the jack housing so as to be moveable in a telescoping fashion therein;

an elongate lead screw disposed within the jack housing;

a plastic nut mounted to the jack leg in a manner so as to be held against rotation relative to the jack leg, the plastic nut threadedly receiving the lead screw such that rotation of the lead screw causes the nut to move axially along the lead screw, thereby causing the jack leg to move in the telescoping manner within the jack housing, the plastic nut including:

safety means for providing a backup threaded engagement for the lead screw in the event the threaded engagement between the plastic nut and the lead screw fails;

guide means for preventing contact between the jack housing and the jack leg;

gear means, disposed within the jack housing, for rotating the lead screw;

crank means for effecting the rotation of the lead screw; and socket means, coupled to the gear means, for detachably coupling the crank means to the gear means, said socket means being configured such that:

the coupling of the crank means and the gear means occurs inside the jack housing, and the socket means extends through a portion of an outer wall of the jack housing in a manner that maintains said portion of the outer wall substantially flush with adjacent portions of the outer wall so that said portion does not protrude outwardly.

13. An extensible jack as defined in claim 12, wherein the guide means comprises a wear guide, affixed to the plastic nut and having an outer periphery that is in slidable contact with an interior wall of the jack housing so as to prevent contact between the jack housing and the jack leg.

14. An extensible jack as defined in claim 13, wherein the crank means comprises manually operable hand crank.

15. An extensible jack as defined in claim 14, wherein the hand crank comprises a ratchet and pawl mechanism such that the hand crank may be selectively rotated only in a single preselected direction to effect rotation of the lead screw.

16. An extensible jack as defined in claim 15, wherein the jack housing has a substantially uniform cross-section along the entire length of the jack housing.

17. An extensible jack as defined in claim 16, wherein the substantially uniform cross-section is rectangular in shape.

18. An extensible jack as defined in claim 17, wherein the gear means comprises a right-angled gear assembly having a first bevel gear meshed with a second bevel gear, the second bevel gear being connected to the lead screw.

19. An extensible jack as defined in claim 18, wherein the socket means comprises a female socket capable of detachably receiving a correspondingly shaped male socket connector operatively coupled to the hand crank, the female socket being connected to the first bevel gear, whereby rotation of the female socket causes rotation of the first bevel gear.

20. An extensible camper jack comprising:

a jack housing adapted to be affixed to a load to be raised or lowered;

a jack leg, slidably received within the jack housing so as to be moveable in a telescoping fashion therein;

a threaded plastic nut mounted to the jack leg in a manner so as to be held against rotation relative to the jack leg;

an elongate lead screw threadedly received by the plastic nut such that rotation of the lead screw causes the plastic nut to move axially along the lead screw, thereby causing the jack leg to move in the telescoping manner within the jack housing;

gear means, completely disposed within the jack housing, for causing the lead screw to be rotated;

a socket connected to the gear means, said socket being configured to extend through a portion of an outer wall of the jack housing in a manner that maintains said portion of the outer wall substantially flush with adjacent portions of the outer wall so that said portion does not protrude outwardly; and a manually operable hand crank that is detachably coupled to the socket so as to allow for manually effecting the rotation of the lead screw by rotating the hand crank, said coupling occurring inside the jack housing, the hand crank including:

a ratchet and pawl mechanism whereby the hand crank may be selectively rotated only in a single preselected direction to effect rotation of the lead screw.

21. An extensible jack as defined in claim 20, wherein the plastic nut further comprises a wear guide, affixed to the plastic nut and having an outer periphery that is in slidable contact with an interior wall of the jack housing so as to prevent contact between the jack housing and the jack leg.

22. An extensible jack as defined in claim 21, wherein the jack housing has a substantially uniform cross-section along the entire length of the jack housing.

23. An extensible jack as defined in claim 22, wherein the substantially uniform cross-section is rectangular in shape.

24. An extensible jack as defined in claim 23, wherein the gear means comprises a right-angled gear assembly having a first bevel gear meshed with a second bevel gear, and wherein the socket is connected to the first bevel gear, whereby rotation of the socket causes rotation of the first bevel gear.

25. An extensible camper jack comprising:

a jack housing adapted to be affixed to a load to be raised or lowered;

a jack leg, slidably received within the jack housing so as to be moveable in a telescoping fashion therein;

an elongate lead screw disposed within the jack housing;

a plastic nut mounted to the jack leg in a manner so as to be held against rotation relative to the jack leg, the plastic nut threadedly receiving the lead screw such that rotation of the lead screw causes the nut to move axially along the lead screw, thereby causing the jack leg to move in the telescoping manner within the jack housing, the plastic nut including guide means for preventing contact between the jack housing and the jack leg;

gear means, disposed within the jack housing, for rotating the lead screw;

crank means for effecting the rotation of the lead screw; and socket means, coupled to the gear means, for detachably coupling the crank means to the gear means, said socket means being configured such that:

the coupling of the crank means and the gear means occurs inside the jack housing, and the socket means extends through a portion of an outer wall of the jack housing in a manner that maintains said portion of the outer wall substantially flush with adjacent portions of the outer wall so that said portion does not protrude outwardly.

26. An extensible jack as defined in claim 25, wherein the guide means comprises a wear guide, affixed to the plastic nut and having an outer periphery that is in slidable contact with an interior wall of the jack housing so as to prevent contact between the jack housing and the jack leg.

27. An extensible jack comprising:

a hollow jack housing that is substantially uniform in cross-section along its entire length and which is adapted to be affixed to a load to be raised or lowered;

a jack leg, slidably received within the jack housing so as to be moveable in a telescoping fashion therein;

an elongate lead screw disposed within the jack housing;

a plastic nut having internal threads which are in threaded engagement with the lead screw, the plastic nut being mounted within the jack leg in a manner so as to be held against rotation relative to the jack leg such that rotation of the lead screw causes the plastic nut to move axially along the lead screw, thereby causing the jack leg to move in the telescoping manner within the jack housing, the plastic nut further including
- a wear guide, affixed to the plastic nut and having an outer periphery that is in slidable contact with an interior wall of the jack housing so as to prevent contact between the jack housing and the jack leg;

right-angled gearing disposed substantially within a top end portion of the jack housing, the right-angled gearing comprising a first beveled gear that meshes with a second bevel gear, the second beveled gear being connected to the lead screw;

a socket connected to the first beveled gear, the socket being disposed within the jack housing and extending through a portion of an outer wall of the jack housing in a manner that maintains said portion of the outer wall substantially flush with adjacent portions of the outer wall so that said portion does not protrude outwardly; and a manually operable hand crank that is detachably coupled to the first beveled gear via the socket, said coupling occurring inside the jack housing, and wherein manual rotation of the hand crank effects the rotation of the lead screw, the hand crank including:
- a ratchet and pawl mechanism whereby the hand crank may be selectively rotated only in a single preselected direction to effect rotation of the lead screw.

* * * * *

UNITED STATES PATENT AND TRADEMARK OFFICE
CERTIFICATE OF CORRECTION

PATENT NO. : 5,553,825
DATED : Sept. 10, 1996
INVENTOR(S) : C. Martin Rasmussen

It is certified that error appears in the above-indentified patent and that said Letters Patent is hereby corrected as shown below:

Col. 5, line 65, "Du Pont" should be --du Pont--
Col. 8, line 18, "It will be m" should be --It will be--
Col. 8, line 21, "bevel gear in an" should be --bevel gear in an integral fashion--

Signed and Sealed this

Seventeenth Day of June, 1997

Attest:

BRUCE LEHMAN

Attesting Officer

Commissioner of Patents and Trademarks